US012601207B2

(12) United States Patent
Chopade

(10) Patent No.: US 12,601,207 B2
(45) Date of Patent: Apr. 14, 2026

(54) SYSTEMS AND METHODS FOR SWITCH CONTROL OF MOTOR VEHICLE LATCH

(71) Applicant: BROSE FAHRZEUGTEILE SE & CO. KOMMANDITGESELLSCHAFT, BAMBERG, Bamberg (DE)

(72) Inventor: Sagar Chopade, Pune (IN)

(73) Assignee: BROSE FAHRZEUGTBILE SE & CO. KOMMANDITGESELLSCHAFT, BAMBERG (DE)

(*) Notice: Subject to any disclaimer, the term of this patent is extended or adjusted under 35 U.S.C. 154(b) by 225 days.

(21) Appl. No.: 18/385,433

(22) Filed: Oct. 31, 2023

(65) Prior Publication Data

US 2025/0137302 A1 May 1, 2025

(51) Int. Cl.

*E05B 81/72* (2014.01)
*E05B 81/20* (2014.01)
*E05B 83/16* (2014.01)

(52) U.S. Cl.

CPC .............. *E05B 81/72* (2013.01); *E05B 81/20* (2013.01); *E05B 83/16* (2013.01)

(58) Field of Classification Search

CPC .......... E05B 81/14; E05B 81/18; E05B 81/20; E05B 81/64; E05B 81/66; E05B 81/68; E05B 83/16; E05B 83/18; E05B 83/26

See application file for complete search history.

(56) References Cited

U.S. PATENT DOCUMENTS

| | | | | |
|---|---|---|---|---|
| 6,734,648 | B2 * | 5/2004 | Fukumura | E05B 81/20 318/434 |
| 6,904,717 | B2 * | 6/2005 | Clark | F16D 43/24 49/28 |
| 11,220,848 | B2 * | 1/2022 | Chevalier | E05B 83/24 |
| 11,414,904 | B2 * | 8/2022 | Klein | E05B 85/245 |
| 11,608,662 | B2 * | 3/2023 | Drost | E05B 81/06 |
| 11,613,917 | B2 * | 3/2023 | Im | E05B 81/56 70/278.7 |
| 11,801,900 | B2 * | 10/2023 | Gillis | E05B 77/54 |
| 11,846,125 | B2 * | 12/2023 | Becher | E05B 81/76 |
| 11,859,416 | B2 * | 1/2024 | Johann | E05B 81/14 |
| 2019/0249470 | A1 * | 8/2019 | Sturm | E05B 81/66 |
| 2020/0040618 | A1 * | 2/2020 | Bendel | E05B 81/30 |
| 2024/0344372 | A1 * | 10/2024 | Zeabari | E05B 83/243 |

* cited by examiner

*Primary Examiner* — Kristina R Fulton
*Assistant Examiner* — Noah Horowitz
(74) *Attorney, Agent, or Firm* — Dickinson Wright PLLC

(57) ABSTRACT

A device may include detecting, by at least one latch status sensor, the latch being in a partially closed state and commanding, by a controller, the latch to change from the partially closed state to a fully closed state. The device may receive, from a switch disposed in the vehicle storage compartment, a command to change the latch to either an open state or the partially closed state to at least partially open the closure. Moreover, the device may include executing, by the latch, a cinching cycle to verify that the latch is in the fully closed state and the closure is in a fully closed position. Also, the device may include executing, in response to executing the cinching cycle, a release cycle transitioning the latch from the fully closed state to the partially closed state to move the closure from the fully closed position to a partially closed position.

20 Claims, 6 Drawing Sheets

SYSTEMS AND METHODS FOR SWITCH CONTROL OF MOTOR VEHICLE LATCH

TECHNICAL FIELD

The present disclosure relates to a latch or locking procedure for use in a motor vehicle.

BACKGROUND

Vehicles include closures secured by latches that latch and lock the closures to the vehicle body when the closure is in a partially closed or fully closed position. Certain latches may be configured to provide a number of functions such as power closing, manual closing or locking, power release or opening, manual release, and cinching. Certain closures, such as front trunks used primarily in electric vehicle or vehicle with engines in the middle or rear of the vehicle require two latches to secure the front trunk when the front trunk is in the closed or partially closed position.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting, by at least one latch status sensor, the latch being in a partially closed state. The method may also include commanding, by a controller, the latch to change from the partially closed state to a fully closed state. The method may furthermore include receiving, from a switch disposed in the vehicle storage compartment, a command to change the latch to either an open state or the partially closed state to at least partially open the closure. The method may in addition include executing, by the latch, a cinching cycle to verify that the latch is in the fully closed state and the closure is in a fully closed position. The method may moreover include executing, in response to executing the cinching cycle, a release cycle transitioning the latch from the fully closed state to the partially closed state to move the closure from the fully closed position to a partially closed position. Other embodiments of this aspect include corresponding computer systems, apparatus, and computer programs recorded on one or more computer storage devices, each configured to perform the actions of the methods.

Implementations may include one or more of the following features. The method where the at least one latch status sensor is configured to detect a position of the closure based on a state of the latch. The method may include commanding a warning light disposed in a cabin of the vehicle to activate and warn a driver in response to the receiving step. The method may include determining a vehicle operating state of the vehicle, and executing, in response to the vehicle operating state being a parked state, a second release cycle transitioning the closure from the partially closed position to the an position. The method may include determining a current speed of the vehicle, and executing, in response to the current speed being less than a predetermined threshold and receiving a second indication for the latch to disengage the closure, a second release cycle transitioning the closure from the partially closed position to an open position. The method may include detecting, when the cinching cycle is executed while the latch is in the fully closed state, a motor stall, and determining the latch status sensor is faulty when the detection of a current state of the latch is partially closed and the motor stall occurs. The method may include receiving, from the controller, in response to the determining the latch status sensor is faulty, a service code. The method may include receiving, from the at least one latch status sensor, an indication of a current state of the closure, and displaying, in response to the current state of the closure not being fully closed, to a driver a warning related to the current state of the closure. Implementations of the described techniques may include hardware, a method or process, or a computer tangible medium.

DETAILED DESCRIPTION

Figure 1:
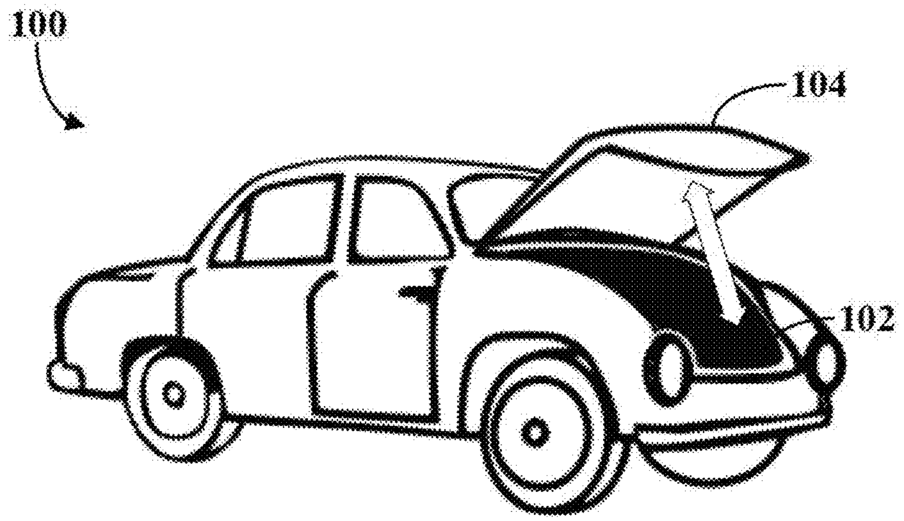
FIG. 1 illustrates a perspective view of an exemplary vehicle and closure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" also contemplates plural referents unless the context clearly indicates otherwise. For example, reference to a component means one or more components. The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Directional terms used herein are made with reference to the views and orientations shown in the exemplary figures. One or more central axes are shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The systems and methods described herein may be configured to manage operations of a powered latch working in cooperation with a vehicle closure which controls access to a vehicle compartment. In some embodiments, the vehicle closure may be a front trunk (a.k.a., a frunk). In some embodiments, a front trunk may be used in an electric vehicle where an electric motor is used to power the drive train of the vehicle. Since no combustion engine is required, the front and rear of the vehicle may have vehicle storage compartments. The systems and methods described herein may be configured to work with both the rear and front trunks. In some embodiments, the vehicle may be a combustion vehicle with either a front or rear trunk depending on where the combustion engine is placed.

The systems and methods described herein may be configured to operate with a powered latch which controls the position of a closure to the vehicle storage compartment. In some embodiments, the vehicle storage compartment may be in one of a fully closed position, a partially closed position, and an open position. In some embodiments, a vehicle storage compartment may have a microswitch placed therein which can be accessed by a user inside the vehicle storage compartment. In some embodiments, the microswitch may have one or more attributes which make it visible to the user when inside the vehicle storage compartment and the closure to the vehicle storage compartment is in a fully closed position. Such attributes may include, but are not limited to glow in the dark paint, a light source, a vial filled with a glowing material such as tritium, or any means of making a microswitch observable in low light conditions.

The systems and methods described herein may be configured to receive a command from a user inside the vehicle compartment to move to a partially closed or open position depending on the speed of the vehicle. In some embodiments a user inside the vehicle compartment may command the closure to the vehicle compartment to open, in response the systems and methods described herein may first perform a cinching operation to ensure the compartment closure is fully closed and then perform a release cycle to move from a fully closed position to a partially open position. In some embodiments the systems and methods described herein may further perform a second release cycle moving the closure from a partially closed position to an open position when the vehicle is traveling at a speed below a predetermined threshold. In some embodiments, the second release cycle is performed in response to receiving a second command to open from the user inside the vehicle storage compartment.

The systems and methods described herein may be utilized to avoid the closure to the vehicle compartment to move to an open position when the vehicle is moving at a speed above a predetermined threshold. For example, when a front trunk lid opens while a vehicle is in motion, the open closure may obstruct the view of the driver leading to a collision or loss of control of the vehicle.

The systems and methods described herein may be configured to include at least one latch status sensor. In some embodiments, the latch status sensor may be configured to determine the status of the cooperation between the vehicle compartment closure and the latch. In some embodiments, the status sensor may be read that the status of the latch is in a fully closed status, in a partially closed status, and a fully closed status.

The systems and methods described herein may be configured to verify that the closure is in a fully closed position before initiating a release cycle. In some embodiments, a release cycle moves the position of the closure from a fully closed position to a partially closed position. In some embodiments, the release cycle moves the position of the closure from a partially open position to a fully open position. For example, a concern arises when the latch status sensor reads that the status of the latch is fully closed but an obstruction (e.g., ice, snow, twig, etc.) does not allow the closure to move from a partially closed position to a fully closed position during a cinching cycle. In this scenario, the latch status sensor reads a status for the latch as being in a fully closed state but the position of the closure is partially closed. Should a user inside the vehicle storage compartment command the closure to open while the vehicle is in motion, a release cycle would be initiated moving the closure 104 from a partially closed position to an open position, obstructing the view of the driver.

The systems and methods described herein may be configured to initiate a cinching cycle to verify that the closure is in a fully closed position before initiating a release cycle moving the closure from a fully closed position to a partially closed position when the vehicle has a speed above a predetermined threshold.

Referring generally to the figures, a vehicle 100 including a vehicle storage compartment 102 and a closure 104 for the vehicle storage compartment 102 is provided. The vehicle 100 may be an electric vehicle or another type of vehicle having a front vehicle storage compartment 102. A power drive unit may be provided to move the closure 104 from a closed position (FIG. 1) as indicated by the directional arrow in FIG. 1. The closure 104 may be part of a closure assembly 110 that may include the power drive unit and one or more latch assemblies 108 that may be configured to engage a striker 112 that may be fixed to either the vehicle body or the closure 104. The power drive unit and each of the latch assemblies 108 may be operatively connected to one or more controllers.

One or more (e.g., both) of the latch assemblies 108 may include a catch 116 that may be configured to move (e.g., rotate) to engage the striker 112 to lock or latch the closure 104 to the body and a pawl 118 may be provided to engage the catch 116 to lock the catch 116 in one or more positions.

FIG. 1 illustrates a perspective view of a portion of the vehicle 100. The vehicle may be an electric vehicle or another type of vehicle having a front vehicle storage compartment 102, but the present disclosure contemplates other types of vehicles. The vehicle 100 may include a vehicle storage compartment 102 and a closure 104. The closure assembly may include the closure 104 such as a frunk lid or tailgate and one or more actuators, such as the power drive unit that may be configured to move (e.g., pivot) the closure 104 between a closed position and an open position (as indicated by the directional arrow). The closure assembly may also include one or more latch assemblies or latches 108 (e.g., two latches 108 one disposed on each side of the closure 104. Each of the latches 108 may be configured to engage a striker that may be fixed to the vehicle 100. In other embodiments, the striker may be fixed to the closure 104 and the latch 108 may be fixed to the vehicle 100.

In one or more embodiments, the closure assembly may include one or more controllers configured to communicate with the latches 108, the power drive unit, or both. The controller may be part of a larger control system and may be controlled by various other controllers throughout the vehicle 100, such as a body control module (BCM) or vehicle system controller (VSC). Therefore, the controller and one or more other controllers can be collectively referred to as a "controller" that controls various actuators in response to signals from various sensors to control functions such as changing states of the latch 108 between an open state, a mechanical secondary state, in which the closure 104 is partially closed, and a mechanical primary state, in which the closure 104 is completely closed. The controller may also control the power drive unit to move the closure 104 between the closed position or partially closed position to the open position.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the closure assembly or the vehicle 100.

Figure 2:
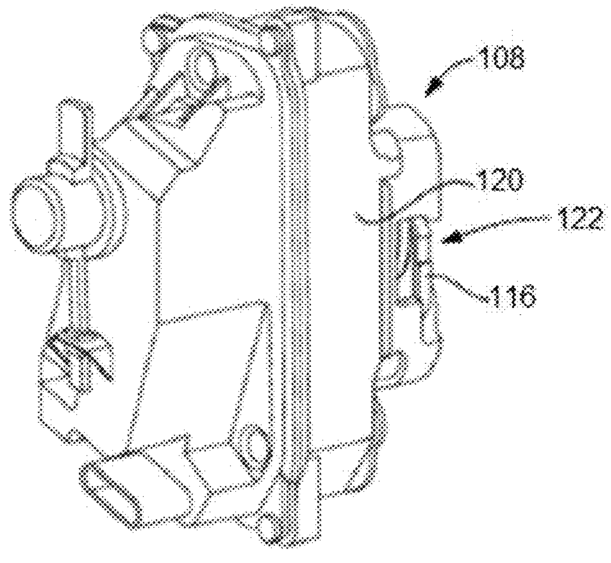
FIG. 2 illustrates a perspective view of a closure latch assembly.

FIG. 2 illustrates a perspective view of the latch assembly 108 according to one or more embodiments. The latch assembly 108 may include a latch mechanism 122 that be disposed in a housing 120. The latch mechanism 122 may include the catch 116, the pawl 118, and other components (not illustrated) configured to cooperate with the pawl 118 and the catch 116.

Figure 3A:
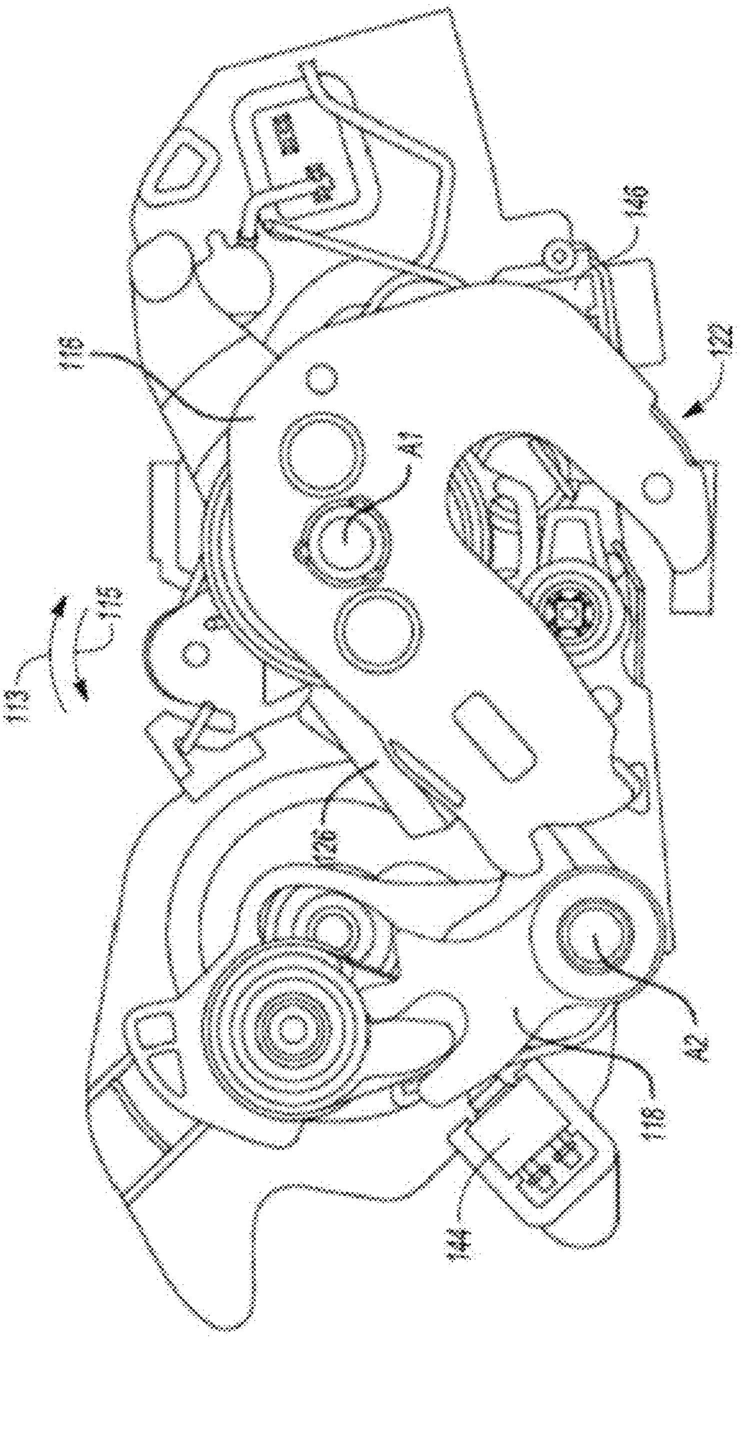
FIG. 3A illustrates a side view of a latch of the latch assembly in an open position.
Figure 3B:
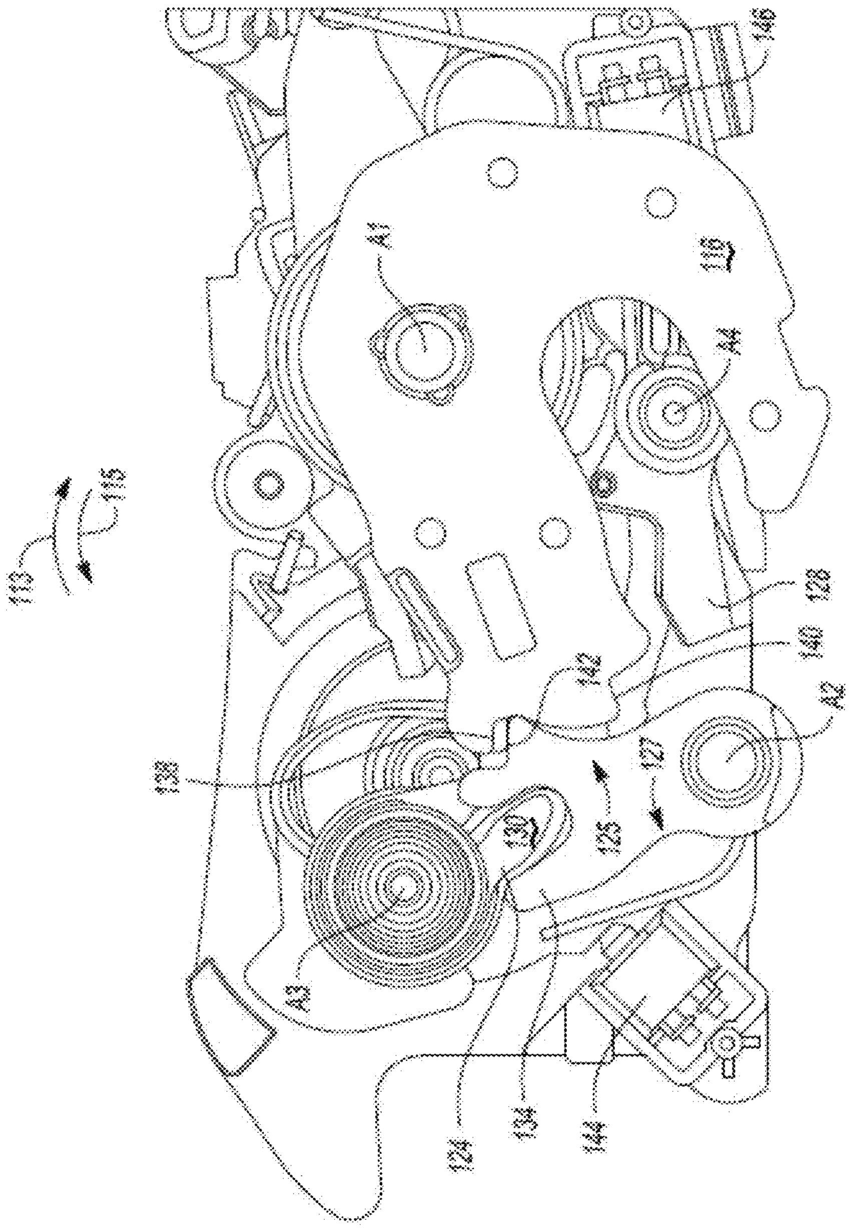
FIG. 3B illustrates a side view of the latch in a partially closed position.
Figure 3C:
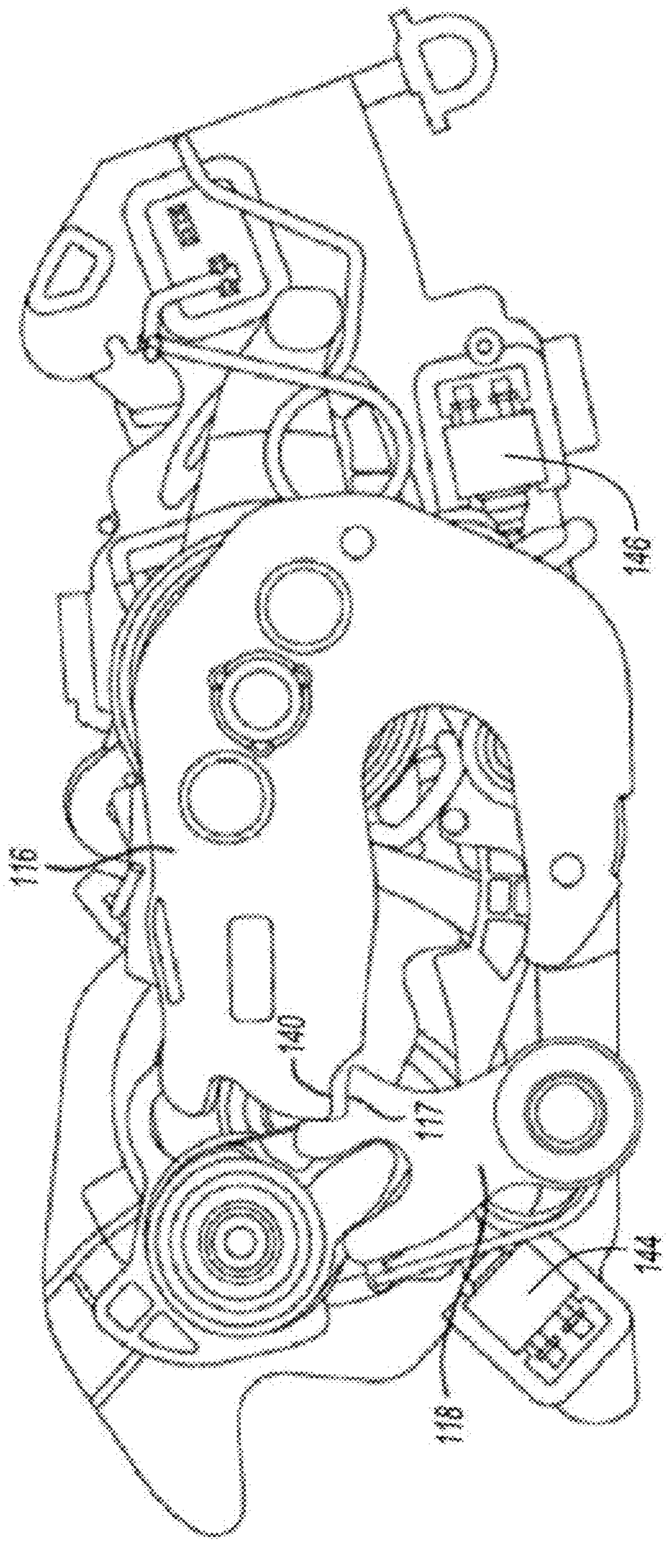
FIG. 3C illustrates a side view of the latch in a fully closed position, in accordance with the present disclosure.

FIGS. 3A-3C illustrate one example arrangement of the latch mechanism 122. FIG. 3A illustrates a plan view of the latch mechanism 122 in the open state, FIG. 3B illustrates a plan view of the latch mechanism 122 in the secondary state, and FIG. 3C illustrates a plan view of the latch mechanism 122 in the primary state. The catch 116 may be configured to pivot or rotate about a first axis A1 to switch between different positions. The catch 116 may be configured to move (e.g., rotate) from an open position (FIG. 3A), in which the latch 108 is in an open state and disengaged from the striker, a first closed position (FIG. 3B) in which the latch 108 is in a partially closed state and is engaged with the striker to retain the closure 104 in a partially closed position, and a second closed position (FIG. 3C) in which the closure 104 is fully closed. As the state of the latch 108 changes from the first closed position to the second closed position, the catch 116 may pull against the striker to cinch or pull the closure 104 to the second closed position (e.g., the fully closed position).

When the catch 116 is in the open position, the pawl 118 may be selectively disengaged (e.g., not contacting) the catch 116. As the catch 116 moves from the open position to the first closed position, the pawl 118 may rotate in a blocking direction 125 to selectively engage the catch 116 when the catch 116 is in the first closed position. As the catch 116 moves from the first closed position to the second closed position, the pawl 118 may move further in the blocking direction 115 to hold the catch 116 in the second closed position.

The catch 116 switches between the open position and the closed position by rotating about the first axis A1. The catch 116 moves from the open position to the closed position by rotating in the closing direction 113 (which is clockwise in the illustrated orientation) and moves from the closed position to the open position by rotating in the opening direction 115 (which is counterclockwise in the illustrated orientation). The catch 116 includes an associated clutch lever 136 arranged to pivot about the first axis A1 to rotate the catch 116 between the open position and the closed position. Alternatively, the catch lever 126 may pivot about an axis that is offset from the first axis A1. The catch 116 may be biased towards the open position by one or more resilient members either acting directly or indirectly on the catch. In one embodiment, a pair of springs biases the catch 116 in the opening direction 115.

The latch 108 may include a pawl 118 configured to rotate about a second axis A2. The pawl 118 is configured to engage with the catch 116 to retain the catch 116 in one or more closed positions. For example, the pawl 118 includes a first blocking surface 142 configured to engage with a first detent 138 of the catch 116 to retain the catch 116 in a partially closed position (FIG. 3B). A second detent 140 of the catch 116 to retain the catch in the fully closed position. The pawl 118 is rotatable about the second axis A2 in a blocking direction 125 that brings the pawl 118 into contact with the catch 116 and a free direction 127 that rotates the pawl 118 away from contact with the catch 116. The pawl 118 may be biased in the blocking direction 125 by one or more resilient members acting either directly or indirectly on the pawl 118.

A pawl lever 124 is configured to rotate the pawl 118. The pawl lever 124 may be rotatable about a third axis A3 that is offset relative to the second axis A2. The pawl lever 124 may include an arm 130 that extends from the axis A3 to interact with the pawl 118. For example, the pawl 118 defines a fork 133 that receives the arm 130 therein so that rotation of the pawl lever 124 is input to the pawl 118. Rather than attaching a resilient member to the pawl 118, the pawl lever 124 may be biased to urge the pawl 118 towards the blocking direction.

The geometry of the pawl 118 and the catch 116 may be designed to allow the catch 116 to slide over the pawl 118 in the closing direction 113. However, to reduce the closing effort, the pawl 118 may be rotated and held out of the path of the catch 116 during closing by a blocking lever 128 (sometimes referred to as a coupling lever). The blocking lever 128 holds the pawl 118 away from the catch 116 during closing. The blocking lever 128 may be configured to rotate about a fourth axis A4 and contact and block the pawl lever 124 as the catch 116 rotates from the open position towards the closed position. As stated above, pawl lever 124 and pawl 118 may be biased towards the blocking direction and the blocking lever 128 may be configured to block the pawl 118, by contacting the pawl lever 124, to create a gap between the pawl 118 and the catch 116, so the catch is more easily movable to in the closing direction 113. As an example, the blocking lever 128 forms the gap so that the catch 116 may move towards the closed position without engaging or moving the pawl 118. Avoiding contact with the pawl 118 may result in lower forces required to change the state of the latch 108 to a partially closed or secondary state and a fully closed or primary state. In one or more embodiments, the blocking lever 128 may be arranged with the catch lever 126 so that as the catch lever 126 rotates, the blocking lever 128 also rotates in coordination.

In some embodiments, the latch 108 may include a one or more sensors (e.g., a first switch 144 and a second switch 146) that may be configured to detect a number of positions of one or more components (e.g., the pawl 118 and the catch 116) of the latch 108. As an example, as the latch 108 operates (e.g., changes between the open state, to the secondary position, to the primary position and vice-versa) the first switch 144 may be configured to detect one or more positions of the pawl 118 and the second switch 146 may be configured to detect one or more positions of the catch 116. The switches 144, 146 may be microswitches.

A more in-depth discussion of the latch assembly can be found in Applicant's co-pending application, U.S. Pub. No. 2023/0287714 A1, filed Mar. 10, 2022, which is hereby incorporated in its entirety by reference herein.

Figure 4:
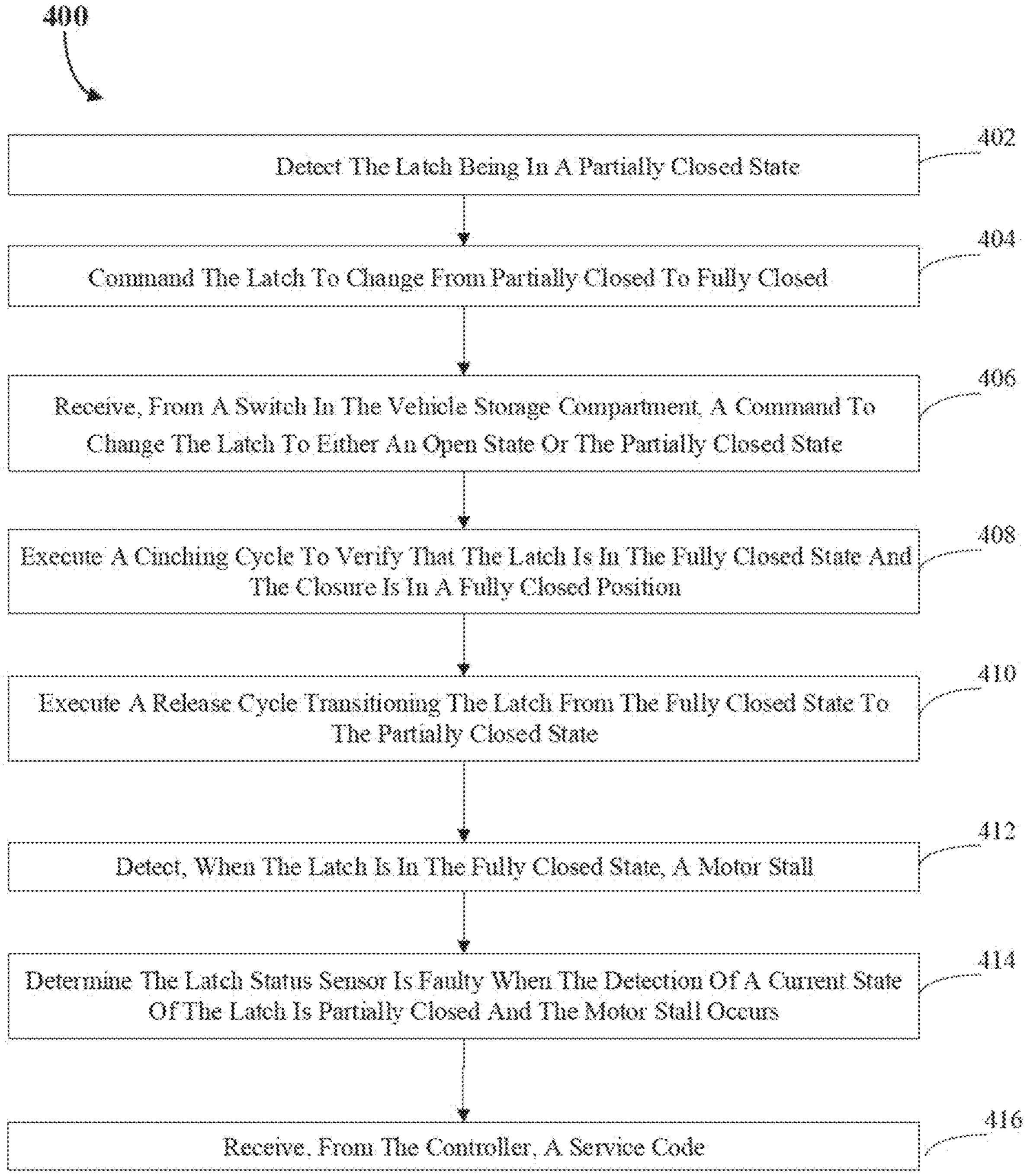
FIG. 4 illustrates a flowchart illustrating an example process for operating a closure based on a command received from a user inside the vehicle compartment and determining that one or more of the latch status sensors are faulty, in accordance with the present disclosure.

FIG. 4 is a flowchart of an example process 400 for operating a closure based on a command received from a user inside the vehicle compartment and determining that one or more of the latch status sensors are faulty. In some implementations, one or more process blocks of FIG. 4 may be performed by the controller.

As shown in FIG. 4, process 400 may include detecting, by at least one latch status sensor, the latch 108 being in a partially closed state (block 402). For example, the vehicle 100 may include a latch status sensor which detects whether the latch is in a fully closed state, a partially closed state, or an open state which the state may be communicated to the controller, as described above. In some embodiments, the vehicle 100 may include three latch status sensors, wherein the first latch status sensor detects a release state, the second latch status sensor detects a partially closed state and a fully closed state, and the third latch status sensor detects the partially closed state, and the fully closed state. In some embodiments the one or more latch status sensors may be microswitches. In some embodiments, the detection of a latch being in a partially closed state may be in response to a user closing the closure 104.

As also shown in FIG. 4, process 400 may include commanding, by a controller, the latch 108 to change from the partially closed state to a fully closed state (block 404). For example, the controller may communicate with one or more actuators associated with the latch 108 to perform a cinching cycle where the latch 108 moves the closure 104 from a partially closed position to a fully closed position, as described above. In some circumstances, an obstruction may prevent the closure 104 from moving from a partially closed position to a fully closed position despite being acted upon by the one or more actuators. The latch status sensor may change from a partially closed status to a fully closed status despite the closure 104 not moving from a partially closed position to a fully closed position.

As further shown in FIG. 4, process 400 may include receiving, from a switch disposed in the vehicle storage compartment, a command to change the latch 108 to either an open state or the partially closed state to at least partially open the closure (block 406). For example, a user inside the vehicle storage compartment 102 may engage a switch disposed in the vehicle storage compartment in order to open the closure 104 when the vehicle is traveling below a predetermined threshold. In some embodiments, the user may engage the switch disposed in the vehicle storage compartment in order to move the closure 104 from a fully closed position to a partially closed position when the vehicle is in motion in order to allow air flow into the vehicle storage compartment 102, while avoiding the dangerous possibility of the closure 104 opening while the vehicle is moving above a speed above a predetermined threshold.

In some embodiments, the switch disposed in the vehicle storage compartment may have one or more attributes which make it visible to the user when inside the vehicle storage compartment and the closure 104 to the vehicle storage compartment is in a fully closed position. Such attributes may include, but are not limited to glow in the dark paint, a light, a vial filled with a glowing material such as tritium, or any means of making a microswitch observable in low light conditions.

As also shown in FIG. 4, process 400 may include executing, by the latch 108, a cinching cycle to verify that the latch 108 is in the fully closed state and the closure 104 is in a fully closed position (block 408). For example, the controller may determine a user inside the closure 104 desires the closure 104 to be moved from a closed position to a partially closed to fully open position. In some circumstances, the closure 104 may be in a partially closed position when the latch status senor reads that the latch is in a fully closed state. The process 400 ensures that the closure 104 is in a fully closed state by performing a cinching cycle before any release cycles occur thereby avoiding a scenario where the closure 104 is moved from a partially open position to an open position while the vehicle is traveling at a speed above a predetermined threshold.

As further shown in FIG. 4, process 400 may include executing, in response to executing the cinching cycle, a release cycle transitioning the latch from the fully closed state to the partially closed state to move the closure from the fully closed position to a partially closed position (block 410). For example, the controller may direct the latch 108 to either move from the fully closed position to the partially closed position or the open position depending on whether the vehicle is in motion or not. When the vehicle is in motion, the controller may command the latch to perform one release cycle, moving the closure from a fully closed position to a partially closed position. When the vehicle is not in motion, the controller may command the latch to perform two release cycles, moving the closure 104 from the fully closed position to the open position As also shown in FIG. 4, process 400 may include detecting, when the latch is in the fully closed state, a motor stall during the cinching cycle (block 412). For example, when the closure 104 is in a fully closed position and a cinching cycle is initiated by the controller, a motor stall will occur by the one or more actuators of the latch 108 since the closure 104 cannot be more closed than the fully closed position. In some embodiments, the motor stall may be detected by the one or more latch status sensors and communicated to the controller.

As further shown in FIG. 4, process 400 may include determining that latch status sensor is faulty when the detection of a current state of the latch is partially closed and the motor stall occurs (block 414). For example, when the closure moves from a partially closed position to a fully closed position, the latch status sensor will indicate the latch 108 is in a fully closed status. However, when the latch status sensor indicates that the latch is in a partially closed position and a motor stall has occurred during the cinching cycle then it can be determined that the latch status sensor is providing conflicting information since a motor stall will only occur when the closure 104 is in a fully closed position.

As also shown in FIG. 4, process 400 may include receiving a service code from the controller (block 416). In some embodiments, a service code may indicate to a vehicle technician that the latch status sensor is faulty and maintenance is required. For example, a mechanic or technician may interface with the controller and receive one or more service codes, among them a service code indicating a fault with the latch status sensor. In some embodiments, when the mechanic or technician has resolved the fault in the latch status sensor, the related service code may be removed by the controller from a memory communicatively coupled to the controller.

Process 400 may include additional implementations, such as any single implementation or any combination of implementations described below and/or in connection with one or more other processes described elsewhere herein. In a first implementation, the method further includes detecting, when the cinching cycle is executed while the latch is in the fully closed state, a motor stall; and determining the latch status sensor is faulty when the detection of a current state of the latch is partially closed and the motor stall occurs.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
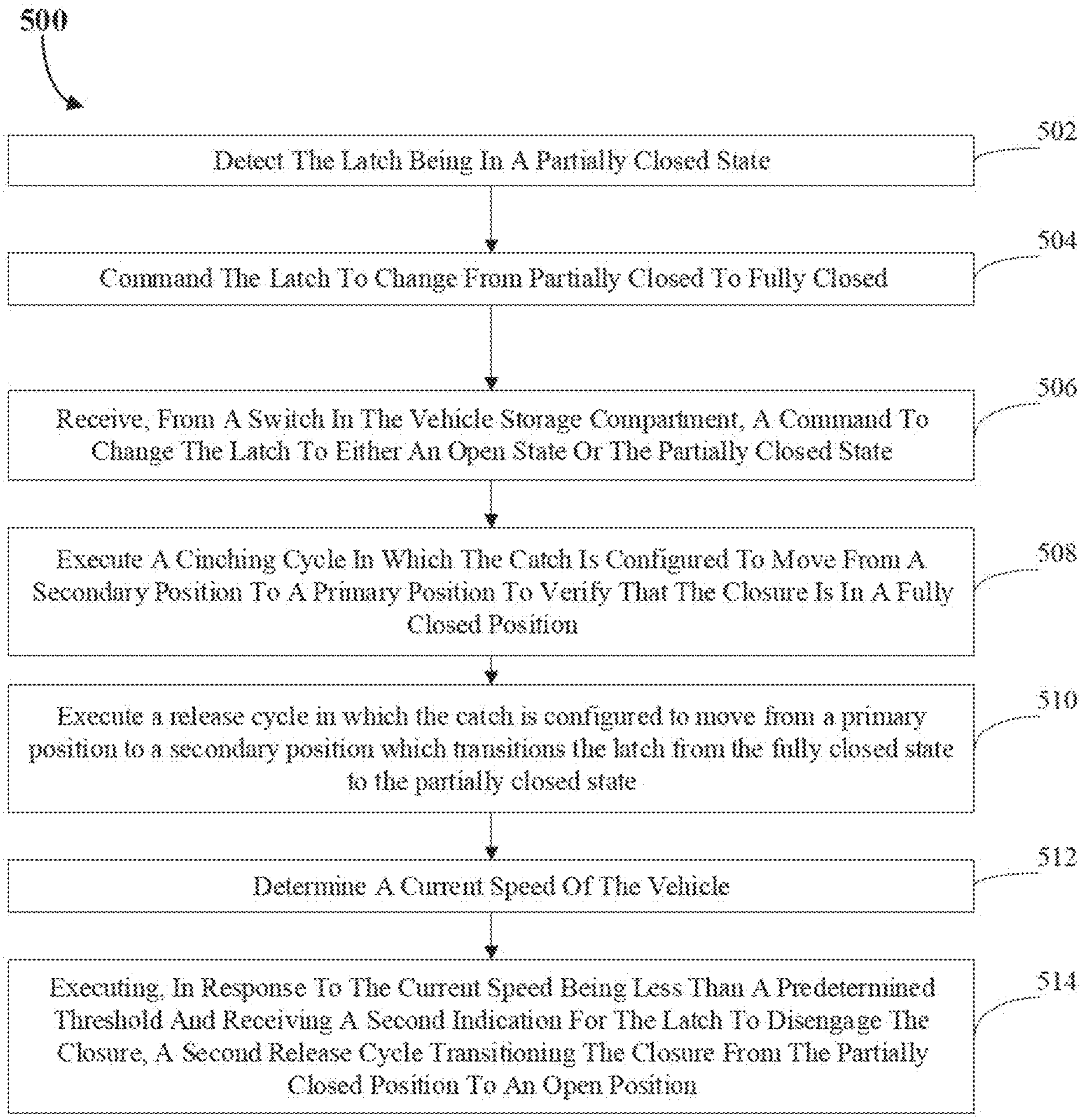
FIG. 5 illustrates a flowchart illustrating an example process for operating the closure based on a command received from a user inside the closure based in part on the speed of the vehicle, in accordance with the present disclosure.

FIG. 5 is a flowchart of an example process 500 for operating the closure based on a command received from a user inside the closure based in part on the speed of the vehicle. In some implementations, one or more process blocks of FIG. 5 may be performed by one or more controllers.

As shown in FIG. 5, process 500 may include detecting, by at least one latch status sensor, the latch being in a partially closed state (block 502). For example, the vehicle 100 may include a latch status sensor which detects whether the latch is in a fully closed state, a partially closed state, or an open state which may be communicated to the controller, as described above. In some embodiments, the vehicle 100 may include three latch status sensors, wherein the first latch status sensor detects a release state, the second latch status sensor detects a partially closed state and a fully closed state, and the third latch status sensor detects the partially closed state, and the fully closed state. In some embodiments the one or more latch status sensors may be microswitches. In some embodiments, the detection of a latch being in a partially closed state may be in response to a user closing the closure 104.

As also shown in FIG. 5, process 500 may include commanding, by a controller, the latch to change from the partially closed state to a fully closed state (block 504). For example, the controller may communicate with one or more actuators associated with the latch 108 perform a cinching cycle where the latch 108 moves the closure 104 from a partially closed position to a fully closed position, as described above. In some circumstances, an obstruction may prevent the closure 104 from moving from a partially closed position to a fully closed position despite being acted upon by the one or more actuators. The latch status sensor may change from a partially closed status to a fully closed status despite the closure 104 not moving from a partially closed position to a fully closed position.

As further shown in FIG. 5, process 500 may include receiving, from a switch disposed in the vehicle storage compartment, a command to change the latch to either an open state or the partially closed state to at least partially open the closure (block 506). For example, a user inside the vehicle storage compartment 102 may engage a switch disposed in the vehicle storage compartment in order to open the vehicle when the vehicle is traveling below a predetermined threshold. In some embodiments, the user may be engage the switch disposed in the vehicle storage compartment in order to move the closure 104 from a fully closed position to a partially closed position when the vehicle is in motion in order to allow fresh air into the vehicle storage compartment 102, while avoiding the dangerous possibility of the closure 104 opening while the vehicle is moving above a speed above a predetermined threshold.

As also shown in FIG. 5, process 500 may include executing, by the latch, a cinching cycle to verify that the latch is in the fully closed state and the closure is in a fully closed position (block 508). For example, as the state of the latch 108 changes from the first closed position to the second closed position, the catch 116 may pull against the striker to cinch or pull the closure 104 to the second closed position (e.g., the fully closed position). In some circumstances, the closure 104 may be in a partially closed position when the latch status senor reads that the latch is in a fully closed state. The process 400 ensures that the closure 104 is in a fully closed state by performing a cinching cycle before any release cycles thereby avoiding a scenario where the closure 104 is moved from a partially open position to an open position while the vehicle is in motion.

As further shown in FIG. 5, process 500 may include executing, in response to executing the cinching cycle, a release cycle transitioning the latch from the fully closed state to the partially closed state to move the closure from the fully closed position to a partially closed position (block 510). For example, as the state of the latch 108 changes from the second closed position to the first closed position, the catch 116 may push against the striker to push the closure 104 to the first closed position (e.g., the partially closed position). In some embodiments, as the latch 108 operates (e.g., changes between the open state, to the secondary position, to the primary position and vice-versa) the first switch 144 may be configured to detect one or more positions of the pawl 118 and the second switch 146 may be configured to detect one or more positions of the catch 116.

As also shown in FIG. 5, process 500 may include determining the current speed of the vehicle (block 512). For example, the controller may receive a value indicating the current speed of the vehicle. In some embodiments, the current speed may be expressed as meters per second, kilometers per hour, miles per hour, or any appropriate unit for measuring the speed at which the vehicle 100 is traveling.

As further shown in FIG. 5, process 500 may include executing, in response to the current speed being less than a predetermined threshold and receiving a second indication for the latch to disengage the closure, a second release cycle transitioning the closure from the partially closed position to an open position (block 514). For example, when the vehicle 100 has a speed of zero or near zero, the closure 104 may be moved to the fully open position without fear that obstructing the view of the driver would lead to a collision. In some embodiments, the process 500 may execute the second release cycle in view of the vehicle being in a parked state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 vehicle
102 vehicle storage compartment
104 closure
108 latch assemblies
110 closure assembly
113 closing direction
116 catch
117 opening direction
118 pawl
120 housing
122 latch mechanism
124 pawl lever
125 blocking direction
126 catch lever
127 free direction
128 blocking lever
130 lever
132 arm
134 fork
136 clutch lever
138 first detent
140 second detent
142 first blocking surface
144 pawl switch
146 catch switch
148 first trace
150 common trace
152 second trace
154 switching legs
156 third pin
158 second pin
160 first pin
162 circuitry
164 graph

What is claimed is:

1. A method for operating a latch configured to cooperate with a closure and enable access to a vehicle storage compartment of a vehicle, the method comprising:

detecting, by at least one latch status sensor, the latch being in a partially closed state;

commanding, by a controller, the latch to change from the partially closed state to a fully closed state;

receiving, from a switch disposed in the vehicle storage compartment, a command to change the latch to either an open state or the partially closed state to at least partially open the closure;

executing, by the latch, a cinching cycle to verify that the latch is in the fully closed state and the closure is in a fully closed position in response to the controller receiving the command from the switch disposed in the vehicle storage compartment; and executing, in response to executing the cinching cycle, a release cycle transitioning the latch from the fully closed state to the partially closed state to move the closure from the fully closed position to a partially closed position.

2. The method of claim 1, wherein the at least one latch status sensor is configured to detect a position of the closure based on a state of the latch.

3. The method of claim 1, further comprising:
commanding a warning light disposed in a cabin of the vehicle to activate and warn a driver in response to the receiving step.

4. The method of claim 1, further comprising:
determining a vehicle operating state of the vehicle; and
executing, in response to the vehicle operating state being a parked state, a second release cycle transitioning the closure from the partially closed position to an open position.

5. The method of claim 1, further comprising:
determining a current speed of the vehicle; and
executing, in response to the current speed being less than a predetermined threshold and receiving a second indication for the latch to disengage the closure, a second release cycle transitioning the closure from the partially closed position to an open position.

6. The method of claim 1, the method further comprising:
detecting, when the cinching cycle is executed while the latch is in the fully closed state, a motor stall; and
determining the latch status sensor is faulty when the detection of a current state of the latch is partially closed and the motor stall occurs.

7. The method of claim 6, further comprising receiving, from the controller, in response to the determining the latch status sensor is faulty, a service code.

8. The method of claim 1, the method further comprising:
receiving, from the at least one latch status sensor, an indication of a current state of the closure; and
displaying, in response to the current state of the closure not being fully closed, to a driver a warning related to the current state of the closure.

9. A latch assembly for use in a vehicle, the latch assembly configured to cooperate with a closure and enable access to a vehicle storage compartment of the vehicle, the latch assembly comprising:
a latch including,
a catch configured to engage a striker disposed on either the closure or a body of the vehicle,
a pawl configured to selectively engage the catch;
at least one microswitch configured to detect a state of the latch assembly and a position of the closure based on the state of the latch assembly;
at least one actuator; and
a controller having instructions configured to:
execute a command received from the controller to change the latch from a partially closed state to a fully closed state;
receive, from a switch disposed in the vehicle storage compartment, a command to change the latch to either an open state or the partially closed state to at least partially open the closure;
execute, by the actuator, a cinching cycle in which the catch is configured to move from a secondary position to a primary position to verify that the latch is in the fully closed state and the closure is in a fully closed position in response to the controller receiving the command from the switch disposed in the vehicle storage compartment; and
execute, in response to executing the cinching cycle, a release cycle in which the catch is configured to move from the primary position to the secondary position which transitions the latch from the fully closed state to the partially closed state to move the closure from the fully closed position to a partially closed position.

10. The latch assembly of claim 9, wherein the controller is further configured to:
execute the cinching cycle irrespective of the state of the latch detected by the at least one microswitch.

11. The latch assembly of claim 9, wherein the controller is further configured to:
determine a vehicle operating state of the vehicle; and
execute, in response to the vehicle operating state being a parked state, a second release cycle transitioning the closure from the partially closed position to an open position.

12. The latch assembly of claim 9, wherein the controller is further configured to:
command a warning light disposed in a cabin of the vehicle to activate and warn a driver in response to the receiving the command to change the latch to either an open state or the partially closed state to at least partially open the closure.

13. The latch assembly of claim 9, wherein the controller is further configured to:
receive a current speed of the vehicle; and
execute, in response to the current speed being less than a predetermined threshold and receiving a second indication for the latch to disengage the closure, a second release cycle transitioning the closure from the partially closed position to an open position.

14. The latch assembly of claim 9, wherein the controller is further configured to:
detect, when the cinching cycle is executed while the latch is in the fully closed state, a motor stall;
determine that at least one of the at least one microswitch is faulty when the detection of a current state of the latch is partially closed and the motor stall occurs; and
receive, from the controller, in response to determining the at least one of the at least one microswitch is faulty, a service code.

15. The latch assembly of claim 9, wherein the controller is further configured to:
display, in response to a current state of the latch not being fully closed, to a driver a warning related to the current state of the latch.

16. A device for operating a latch configured to cooperate with a closure and enables access to a vehicle storage compartment of a vehicle comprising, a controller configured to:
command, by the controller, the latch to change from a partially closed state to a fully closed state;
receive, from a switch disposed in the vehicle storage compartment, a command to change the latch to either an open state or the partially closed state to at least partially open the closure;
execute, by the latch, a cinching cycle to verify that the latch is in the fully closed state and the closure is in a fully closed position in response to the controller receiving the command from the switch disposed in the vehicle storage compartment; and
execute, in response to executing the cinching cycle, a release cycle transitioning the latch from the fully closed state to the partially closed state to move the closure from the fully closed position to a partially closed position.

17. The device of claim 16, wherein the latch includes a first latch status sensor which detects the latch having the open state, second latch status sensor which detects the latch having the partially closed state and the fully closed state, and a third latch status sensor which detects the latch having the partially closed state and the fully closed state.

18. The device of claim 16, wherein the controller is further configured to:

determine a vehicle operating state of the vehicle; and execute, in response to the vehicle operating state being a parked state, a second release cycle transitioning the closure from the partially closed position to an open position.

19. The device of claim 17, wherein the controller is further configured to:

receive, from the second latch status sensor, that a current state of the latch is partially closed;

receive, from the third latch status sensor, that the current state of the latch is fully closed;

execute the cinching cycle in response to conflicting readings of the second latch status sensor and third latch status sensor; and determine the second latch status sensor is faulty when a motor stall occurs during the cinching cycle.

20. The device of claim 19, wherein the controller is further configured to generate, in response to determining the second latch status sensor is faulty, a service code.

* * * * *